(12) United States Patent
Ahn et al.

(10) Patent No.: US 12,058,476 B2
(45) Date of Patent: Aug. 6, 2024

(54) METHODS, SYSTEMS, AND COMPUTER PROGRAM PRODUCTS FOR PROVIDING VIDEO CALL SERVICE

(71) Applicant: Hyperconnect Inc., Seoul (KR)

(72) Inventors: Sang Il Ahn, Cheongju-si (KR); Byung Jong Kim, Seoul (KR); Eun Hee Choi, Seoul (KR)

(73) Assignee: Hyperconnect Inc., Seoul (KR)

(*) Notice: Subject to any disclaimer, the term of this patent is extended or adjusted under 35 U.S.C. 154(b) by 0 days.

(21) Appl. No.: 17/515,293

(22) Filed: Oct. 29, 2021

(65) Prior Publication Data

US 2022/0337781 A1 Oct. 20, 2022

(30) Foreign Application Priority Data

Apr. 16, 2021 (KR) .................. 10-2021-0050122
Apr. 16, 2021 (KR) .................. 10-2021-0050137
Apr. 16, 2021 (KR) .................. 10-2021-0050138

(51) Int. Cl.
*H04N 7/14* (2006.01)
*G06F 3/04817* (2022.01)
(Continued)

(52) U.S. Cl.
CPC ............ *H04N 7/141* (2013.01); *G06F 3/14* (2013.01); *H04M 1/663* (2013.01);
(Continued)

(58) Field of Classification Search
CPC .. H04N 7/141; H04N 7/147; H04N 2007/145; H04M 1/72439;
(Continued)

(56) References Cited

U.S. PATENT DOCUMENTS 8,577,000 B1 * 11/2013 Brown .............. H04M 1/72439
379/88.13
8,605,872 B2 12/2013 Mock
(Continued)

FOREIGN PATENT DOCUMENTS

EP 3481058 A1 5/2019
EP 3487169 A1 5/2019
(Continued)

OTHER PUBLICATIONS

Extended European Search Report for European Application No. 22151216.3, Search completed May 12, 2022, Mailed May 20, 2022, 7 Pgs.
(Continued)

*Primary Examiner* — Binh Kien Tieu
(74) *Attorney, Agent, or Firm* — KPPB LLP

(57) ABSTRACT

Provided is an operation method of a server for relaying a call. The server relays a preliminary call between a first terminal and a second terminal for a preset time, based on matching of a first user of the first terminal and a second user of the second terminal, and after the preset time has elapsed, receives, from the first terminal and the second terminal, a response as to whether to continue the preliminary call. The server may determine whether to proceed with a main call based on the received response.

20 Claims, 10 Drawing Sheets

(51) Int. Cl.
  *G06F 3/14* (2006.01)
  *H04M 1/663* (2006.01)
  *H04M 1/72433* (2021.01)
  *H04M 1/72439* (2021.01)
  *H04M 1/72448* (2021.01)
  *H04M 1/72469* (2021.01)
(52) U.S. Cl.
  CPC ... *H04M 1/72433* (2021.01); *H04M 1/72439* (2021.01); *H04M 1/72448* (2021.01); *H04M 1/72469* (2021.01); *H04N 7/147* (2013.01); *G06F 3/04817* (2013.01); *H04N 2007/145* (2013.01)
(58) Field of Classification Search
  CPC ......... H04M 1/72469; H04M 1/72433; H04M 1/72448; H04M 1/663; G06F 3/14; G06F 3/04817
  USPC ...................................................... 348/14.01
  See application file for complete search history.

(56) References Cited

U.S. PATENT DOCUMENTS

| | | | |
|---|---|---|---|
| 8,666,454 | B2 | 3/2014 | Sim et al. |
| 8,681,203 | B1 | 3/2014 | Mn et al. |
| 8,977,063 | B2 | 3/2015 | Lee et al. |
| 9,065,967 | B2 | 6/2015 | Hubner et al. |
| 9,578,282 | B1 | 2/2017 | Sills et al. |
| 10,523,900 | B1 | 12/2019 | Jiang et al. |
| 10,531,042 | B2 | 1/2020 | Ahn et al. |
| 10,567,450 | B1 | 2/2020 | Gopal et al. |
| 10,721,437 | B2 | 7/2020 | Ahn et al. |
| 10,728,499 | B2 | 7/2020 | Ahn et al. |
| 10,855,727 | B2 | 12/2020 | Ahn et al. |
| 11,032,512 | B2 | 6/2021 | Ahn et al. |
| 11,051,141 | B2 * | 6/2021 | Angapova .......... G06Q 10/1095 |
| 11,196,777 | B2 | 12/2021 | Ahn et al. |
| 11,252,373 | B2 | 2/2022 | Ahn et al. |
| 11,606,533 | B2 | 3/2023 | Ahn et al. |
| 2002/0094806 | A1 | 7/2002 | Kamimura |
| 2003/0091239 | A1 | 5/2003 | Imagawa et al. |
| 2004/0249811 | A1 | 12/2004 | Shostack et al. |
| 2008/0192736 | A1 | 8/2008 | Jabri et al. |
| 2008/0242352 | A1 | 10/2008 | Koshijima et al. |
| 2008/0259154 | A1 | 10/2008 | Garrison et al. |
| 2008/0298571 | A1 | 12/2008 | Kurtz et al. |
| 2008/0300010 | A1 | 12/2008 | Border et al. |
| 2010/0145869 | A1 | 6/2010 | Brown |
| 2011/0249073 | A1 | 10/2011 | Cranfill et al. |
| 2011/0249086 | A1 * | 10/2011 | Guo .......................... G09G 5/14  348/E7.083 |
| 2011/0276624 | A1 * | 11/2011 | Akhtar ..................... H04L 67/34  709/203 |
| 2012/0276504 | A1 | 11/2012 | Chen et al. |
| 2013/0003947 | A1 | 1/2013 | Farah et al. |
| 2014/0040368 | A1 | 2/2014 | Janssens |
| 2014/0118467 | A1 | 5/2014 | Kim et al. |
| 2014/0177813 | A1 * | 6/2014 | Leeds ................ H04M 3/42348  379/67.1 |
| 2014/0267583 | A1 | 9/2014 | Zhu et al. |
| 2014/0362163 | A1 | 12/2014 | Winterstein et al. |
| 2014/0368600 | A1 * | 12/2014 | Do ........................ G06V 40/16  348/14.01 |
| 2015/0109406 | A1 | 4/2015 | Carlsson et al. |
| 2015/0227902 | A1 | 8/2015 | Bertanzetti et al. |
| 2015/0229882 | A1 | 8/2015 | Liu |
| 2015/0244949 | A1 | 8/2015 | Laroia et al. |
| 2015/0244979 | A1 | 8/2015 | Andrada et al. |
| 2015/0271444 | A1 | 9/2015 | Defazio et al. |
| 2015/0339627 | A1 * | 11/2015 | Brunner ................. G06Q 10/10  705/345 |
| 2016/0019412 | A1 | 1/2016 | Kang et al. |
| 2016/0037129 | A1 | 2/2016 | Tangeland et al. |
| 2016/0352671 | A1 | 12/2016 | Vaccari |
| 2017/0064525 | A1 | 3/2017 | Ben Arzi et al. |
| 2018/0063278 | A1 | 3/2018 | Helled et al. |
| 2018/0160074 | A1 | 6/2018 | Mercredi et al. |
| 2018/0232562 | A1 | 8/2018 | Cambor |
| 2018/0270652 | A1 | 9/2018 | Park |
| 2018/0309801 | A1 | 10/2018 | Rathod |
| 2018/0365904 | A1 | 12/2018 | Holmes |
| 2019/0037173 | A1 | 1/2019 | Lee et al. |
| 2019/0045335 | A1 * | 2/2019 | Jin ........................ H04W 88/02 |
| 2019/0075237 | A1 | 3/2019 | Cheung |
| 2019/0075340 | A1 | 3/2019 | Hochart |
| 2019/0158784 | A1 | 5/2019 | Ahn et al. |
| 2019/0182378 | A1 | 6/2019 | Hou et al. |
| 2019/0199962 | A1 | 6/2019 | Ahn et al. |
| 2019/0356715 | A1 | 11/2019 | Rands |
| 2020/0021685 | A1 | 1/2020 | Borukhoff |
| 2020/0099888 | A1 | 3/2020 | Ahn et al. |
| 2020/0203024 | A1 | 6/2020 | Hunter et al. |
| 2020/0314154 | A1 | 10/2020 | Ahn et al. |
| 2021/0037209 | A1 | 2/2021 | Ahn et al. |
| 2021/0051184 | A1 | 2/2021 | Ahn et al. |
| 2022/0337779 | A1 | 10/2022 | Ahn et al. |
| 2022/0337782 | A1 | 10/2022 | Ahn et al. |
| 2023/0070223 | A1 | 3/2023 | Ahn et al. |
| 2023/0095973 | A1 * | 3/2023 | Rad ........................ G06Q 30/02  707/723 |

FOREIGN PATENT DOCUMENTS

| | | | |
|---|---|---|---|
| JP | H05328337 | A | 12/1993 |
| JP | H1196229 | A | 4/1999 |
| JP | 2003219383 | A | 7/2003 |
| JP | 2004056488 | A | 2/2004 |
| JP | 2005322969 | A | 11/2005 |
| JP | 2008085421 | A | 4/2008 |
| JP | 2013179601 | A | 9/2013 |
| JP | 2017138948 | A | 8/2017 |
| JP | 2019088004 | A | 6/2019 |
| KR | 20090041634 | A | 4/2009 |
| KR | 20090093528 | A | 9/2009 |
| KR | 20110080347 | A | 7/2011 |
| KR | 20130101823 | A | 9/2013 |
| KR | 101564654 | B1 | 10/2015 |
| KR | 101669521 | B1 | 10/2016 |
| KR | 101673032 | B1 | 10/2016 |
| KR | 20160133775 | A | 11/2016 |
| KR | 20190056538 | A | 5/2019 |

OTHER PUBLICATIONS

Extended European Search Report for European Application No. 20188232.1 Search completed Oct. 23, 2020, Mailed Nov. 2, 2020, 8 Pgs.
Japanese Office Action for Application No. 2020-121806, dated Nov. 22, 2021, 3 pages.
Office Action for Korean Application No. 10-2019-0091753, Dated Jul. 7, 2020.
Baek, "Hyperconnect dating app 'Slide' launched in North America and Germany", ZD Net Korea, Published Nov. 17, 2020, Obtained from https://zdnet.co.kr/view/?no=20201117134248, 3 pgs.
Extended European Search Report for European Patent Application No. 22167645.5, mailed Sep. 16, 2022, 9 pages.
Extended European Search Report for European Patent Application No. 22167662.0, mailed Sep. 16, 2022, 13 pages.
Extended Search Report for European Application No. 18213153.2, Search completed Apr. 29, 2019, Mailed May 7, 2019, 10 Pgs.
Japanese Office Action for JP Patent application No. 2018-238545, dated Nov. 1, 2019.
Korean Office Action for Application No. 10-2017-0181519, Dated Apr. 18, 2019, 11 Pgs.

* cited by examiner

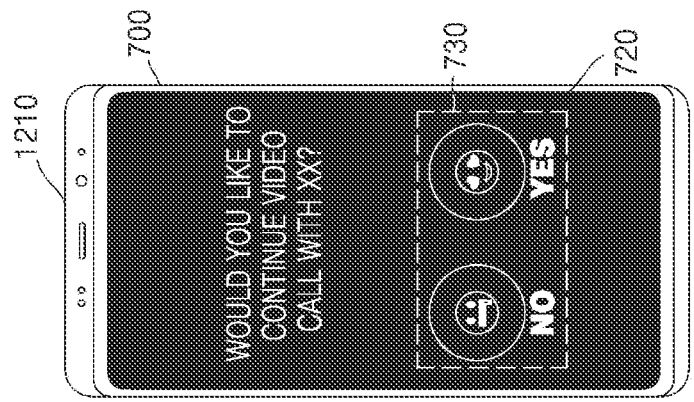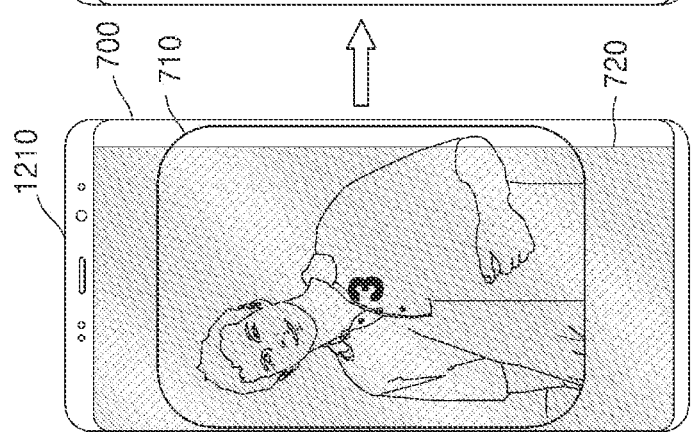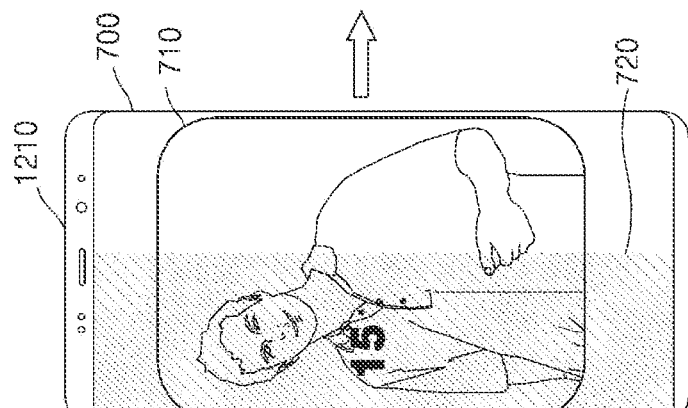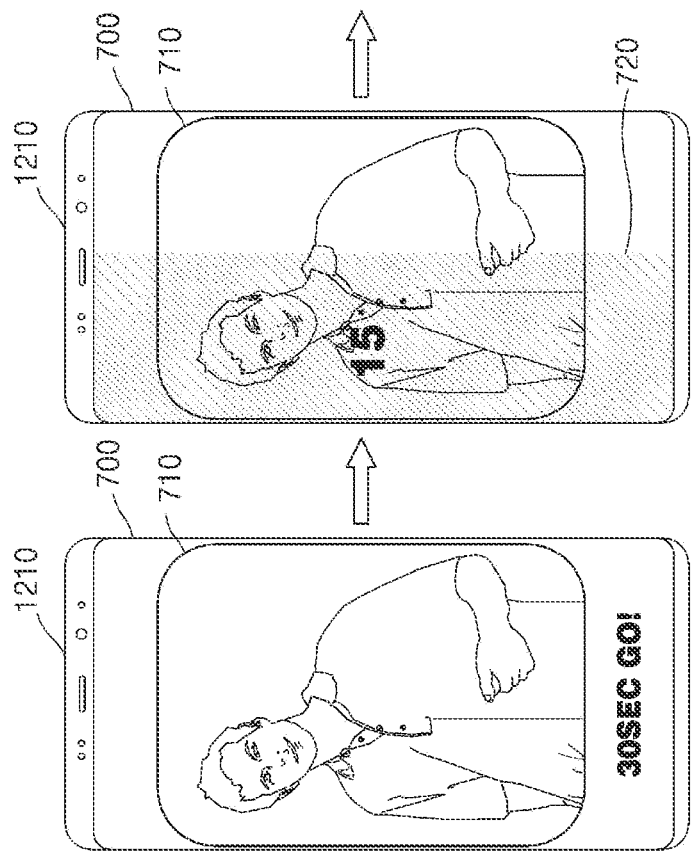

METHODS, SYSTEMS, AND COMPUTER PROGRAM PRODUCTS FOR PROVIDING VIDEO CALL SERVICE

CROSS-REFERENCE TO RELATED APPLICATION

This application claims priority under 35 U.S.C. § 119 to Korean Patent Application No. 10-2021-0050122 filed in the Korean Intellectual Property Office on Apr. 16, 2021, Korean Patent Application No. 10-2021-0050137 filed in the Korean Intellectual Property Office on Apr. 16, 2021, and Korean Patent Application No. 10-2021-0050138 filed in the Korean Intellectual Property Office on Apr. 16, 2021, the disclosures of which are incorporated by reference herein in their entireties.

BACKGROUND

1. Field

The present disclosure relates to a method, system, and computer program product for providing a video call service.

2. Description of the Related Art

With the development of wireless communication technology, it became possible to transmit massive data at a high speed, and thus provision of not only a voice call service, but also a video call service is becoming increasingly common. The video call service refers to a call service for transmitting and receiving audio signals and video signals between a plurality of terminals.

Users may perform video calls by using portable terminals such as smartphones or smart tablets, and the users performing the video calls may already know each other or may not know each other.

Meanwhile, when a video call is performed between users who do not know each other, the users may feel psychological burdens when connecting to or leaving the video call, and thus a solution is required for the users to perform the video call more freely.

SUMMARY

Provided are a method, system and computer program product for providing a video call service.

Problems to be solved by the present disclosure are not limited to the problems mentioned above. Other unmentioned problems and advantages of the present disclosure may be understood by the following description, and will be more clearly understood by embodiments of the present disclosure. In addition, it will be appreciated that the problems and advantages to be solved by the present disclosure may be realized by means and combinations thereof indicated in the claims.

Additional aspects will be set forth in part in the description which follows and, in part, will be apparent from the description, or may be learned by practice of the presented embodiments of the disclosure.

According to an embodiment of the present disclosure, an operation method of a server, includes: identifying whether matching between a first user of a first terminal and a second user of a second terminal is completed; relaying a preliminary call between the first terminal and the second terminal for a preset time, based on the matching; receiving, from each of the first terminal and the second terminal, a response as to whether to proceed with a main call after the preset time has elapsed; and determining whether to proceed with the main call, based on the response.

The determining of whether to proceed with the main call may include: when a response accepting proceeding with the main call is received from each of the first terminal and the second terminal, proceeding with the main call; and when a response rejecting proceeding with the main call is received from at least one of the first terminal and the second terminal, not proceeding with the main call.

A first graphical user interface displayed on a display of each of the first terminal and the second terminal during the preset time and a second graphical user interface displayed on the display of each of the first terminal and the second terminal while the main call is in progress may be different from each other.

The first graphical user interface may include an image area of a counterpart terminal performing the preliminary call and a blocking area covering at least a part of the image area, wherein visibility of the image area may change over time.

The second graphical user interface may not include the blocking area when the main call is proceeded.

The relaying during the preset time may include displaying a graphical user interface for sequentially counting down the preset time on each of a display of the first terminal and a display of the second terminal.

The identifying of whether the matching is completed may include: receiving a first like signal transmitted by the first terminal, based on profile information about the second user; and receiving a second like signal transmitted by the second terminal, based on profile information about the first user.

The preliminary call may correspond to a voice call and the main call may correspond to a video call.

According to another embodiment of the present disclosure, a computer program product includes one or more computer-readable recording media storing a program for identifying whether matching between a first user of a first terminal and a second user of a second terminal is completed; relaying a preliminary call between the first terminal and the second terminal for a preset time, based on the matching; receiving, from each of the first terminal and the second terminal, a response as to whether to proceed with a main call after the preset time has elapsed; and determining whether to proceed with the main call, based on the response.

According to another embodiment of the present disclosure, a device for relaying a call, includes: a memory storing at least one program; and at least one processor for executing the at least one program to relay the call, wherein the at least one processor identifies whether matching between a first user of a first terminal and a second user of a second terminal is completed, relays a preliminary call between the first terminal and the second terminal for a preset time, based on the matching, receives a response as to whether to continue a main call after the preset time has elapsed, from each of the first terminal and the second terminal, and determines whether to proceed with the main call based on the response.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A-7D illustrates examples of a graphical user interface displayed on a display of a terminal while a preliminary call is in progress;

DETAILED DESCRIPTION

General terms currently widely used have been selected as terms used in embodiments, considering functions in the embodiments. However, the terms may vary according to the intention of one of ordinary skill in the art, precedent cases, or the appearance of new technologies. Also, some terms have been arbitrarily selected for specific cases, and in this case, the meaning of the selected terms will be described in detail in the detailed description of a corresponding embodiment. Thus, the terms used in the embodiments have to be defined based on the meanings of the terms together with the description throughout the specification, rather than simple names of the terms.

In the description of embodiments, when a part is "connected" to another part, the part may not only be directly connected to the other part, but may also be electrically connected to the other part with another element in between. In addition, when a part "includes" a certain element, the part may further include another element instead of excluding the other element, unless otherwise stated.

The terms such as "include", "comprise", and the like used in the present embodiments should not be construed as necessarily including all of several components or operations described herein, but should be construed as not including some components or operations thereamong or as further including additional components or operations.

The description of the following embodiments should not be construed as limiting the scope of rights, and what can be easily inferred by one of ordinary skill in the art should be construed as belonging to the scope of the embodiments. Hereinafter, exemplary embodiments will be described in detail with reference to the accompanying drawings.

Figure 1:
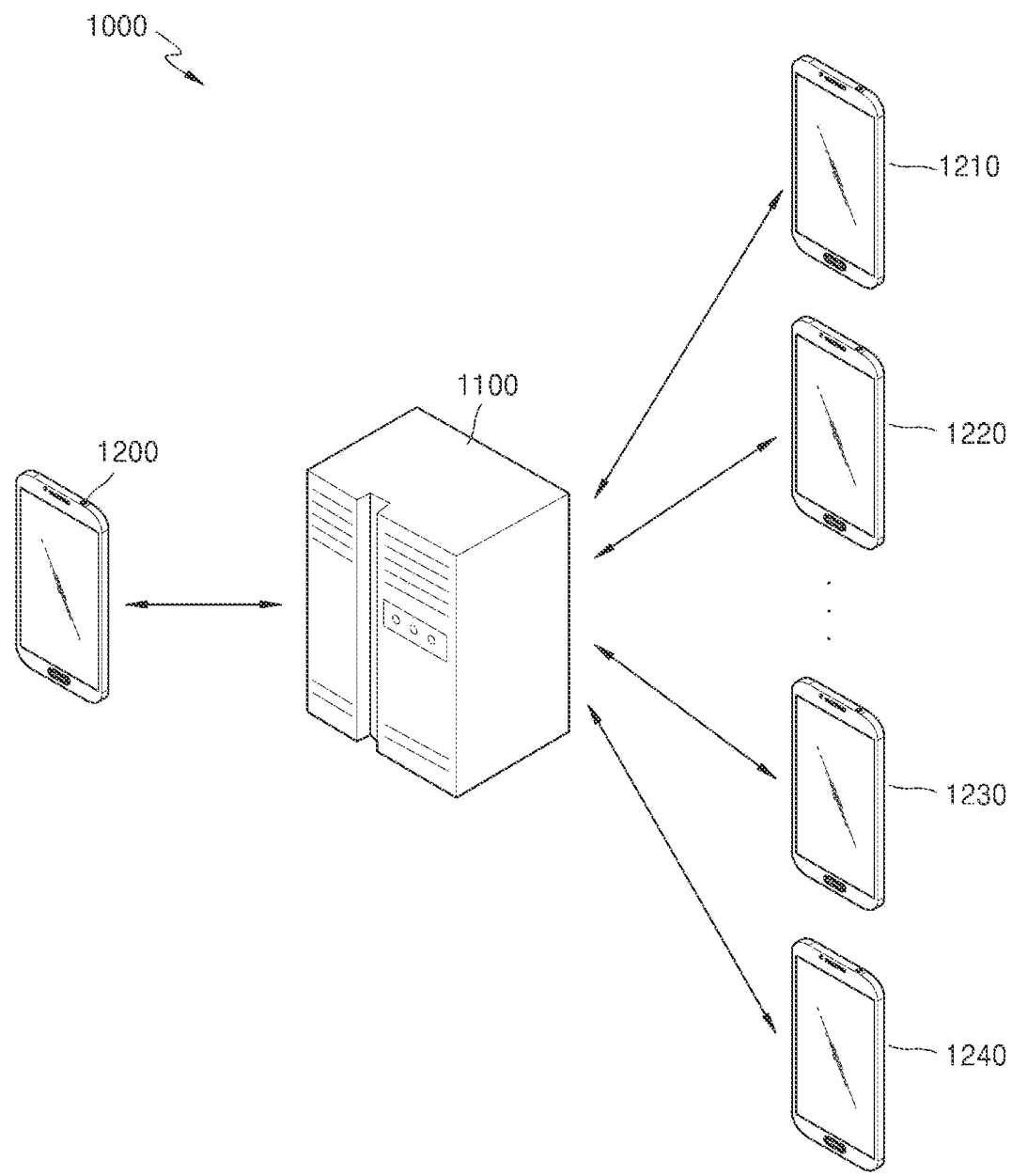
FIG. 1 is a diagram illustrating an example of a system including a server and at least one terminal.

FIG. 1 is a diagram illustrating an example of a system 1000 including a server 1100 and at least one terminal.

The system 1000 according to an embodiment may include the server 1100 and a plurality of user terminals, i.e., a first terminal 1200 and second terminals 1210 to 1240. The first terminal 1200 and the second terminals 1210 to 1240 are illustrated to be five for convenience, but are not limited thereto.

For example, the system 1000 may be a system that provides a video call service. The video call service refers to a service in which a plurality of users may communicate with each other by transmitting their images to other counterparts by using their respective terminals and receiving images of the counterparts. The users using the video call service may exchange images and/or voices through their respective terminals, and/or may transmit and receive text via a chatting function.

The user who intends to use the video call service may directly designate a counterpart to make a video call and use the video call service when the counterpart accepts the video call. Alternatively, the server 1100 providing the video call service may designate a counterpart randomly or according to a certain method, and the user may use the video call service with the designated counterpart.

The server 1100 and the first terminal 1200 and the second terminals 1210 to 1240 may perform communication by using a network. Examples of the network may include a local area network (LAN), a wide area network (WAN), a value-added network (VAN), a mobile radio communication network, a satellite communication network, and a combination thereof. The network may be a data communication network of various network entities shown in FIG. 1 to communicate smoothly with each other, and may include a wired Internet, a wireless Internet, and/or a mobile wireless communication network. Examples of wireless communication include wireless LAN (Wi-Fi), Bluetooth, Bluetooth low energy, Zigbee, Wi-Fi direct (WFD), ultra-wideband (UWB), infrared data association (IrDA), and near field communication (NFC), but are not limited thereto.

The first terminal 1200 and the second terminals 1210 to 1240 may include a smartphone, a tablet personal computer (PC), a PC, a smart television (TV), a mobile phone, a personal digital assistant (PDA), a laptop computer, a media player, a micro server, a global positioning system (GPS) device, an electronic book terminal, a digital broadcast terminal, a navigation device, a kiosk, an MP3 player, a digital camera, a home appliance, a camera-equipped device, and another mobile or non-mobile computing device, but are not limited thereto.

The server 1100 may be a relay device that connects the first terminal 1200 and the second terminals 1210 to 1240 with each other. The server 1100 may provide a relay service to transmit and receive data between the first terminal 1200 and the second terminals 1210 to 1240. The server 1100 may transmit data to the first terminal 1200 and the second terminals 1210 to 1240 or receive data from the first terminal 1200 and the second terminals 1210 to 1240, via the network.

The server 1100 may receive profile information from each of the first terminal 1200 and the second terminals 1210 to 1240. The profile information may include but is not limited to) at least one of a picture of each user, an image of each user, hobby information, nickname information, height information, date of birth information, gender information, residential area information, and/or school information.

For example, a user of the first terminal 1200 may execute an application provided by the server 1100, and the first terminal 1200 may receive, from the server 1100, profile information about at least some of the users of the second terminals 1210 to 1240.

In other words, the user of the first terminal 1200 may be provided with profiles of some of the users of the second terminals 1210 to 1240. For example, the user of the first terminal 1200 may generate a list including likable users among the users of the second terminals 1210 to 1240, based on the provided profiles.

Figure 2:
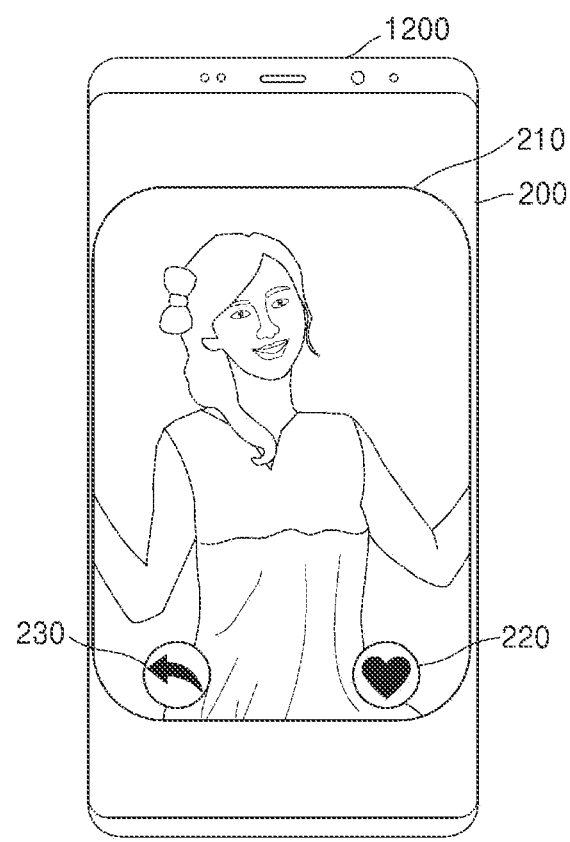
FIG. 2 is a diagram illustrating an example in which a terminal is provided with profile information.

FIG. 2 is a diagram illustrating an example in which a terminal is provided with profile information.

A first user of the first terminal 1200 may receive profile information about some of the users of the second terminals 1210 to 1240 from the server 1100. For example, FIG. 2 may illustrate an example in which profile information 210 of a second user of the second terminal 1210 among a plurality of pieces of profile information received from the server 1100 is displayed on a display 200 of the first terminal 1200. The profile information 210 may include an image or a video including a face of the second user of the second terminal 1210, but embodiments are not limited thereto.

For example, a like icon 220 and a dislike icon 230 may be displayed on the display 200 of the first terminal 1200. The first user of the first terminal 1200 may select one of the like icon 220 and the dislike icon 230, based on the profile information 210 of the second user displayed on the display 200. The first user of the first terminal 1200 may select the like icon 220 when they want to proceed with a video call with the second user, and select the dislike icon 230 when they do not want to proceed with the video call with the second user.

Meanwhile, the first terminal 1200 may transmit, to the server 1100, information indicating that the first user has inputted a like signal, based on the profile information 210 of the second user. Also, the second terminal 1210 may receive, from the first terminal 1200 or server 1100, information indicating that the first user of the first terminal 1200 has inputted a dislike signal.

As described above, the like signal may be transmitted to the server 1100 when the first user presses the like icon 220, but embodiments are not limited thereto. For example, the like signal may be transmitted to the server 1100 even when the first user swipes or drags the like icon 220. Similarly, the dislike signal may be transmitted to the server 1100 when the first user presses the dislike icon 230, but embodiments are not limited thereto, and the dislike signal may be transmitted to the server 1100 even when the first user swipes or drags the dislike icon 230.

Figure 3:
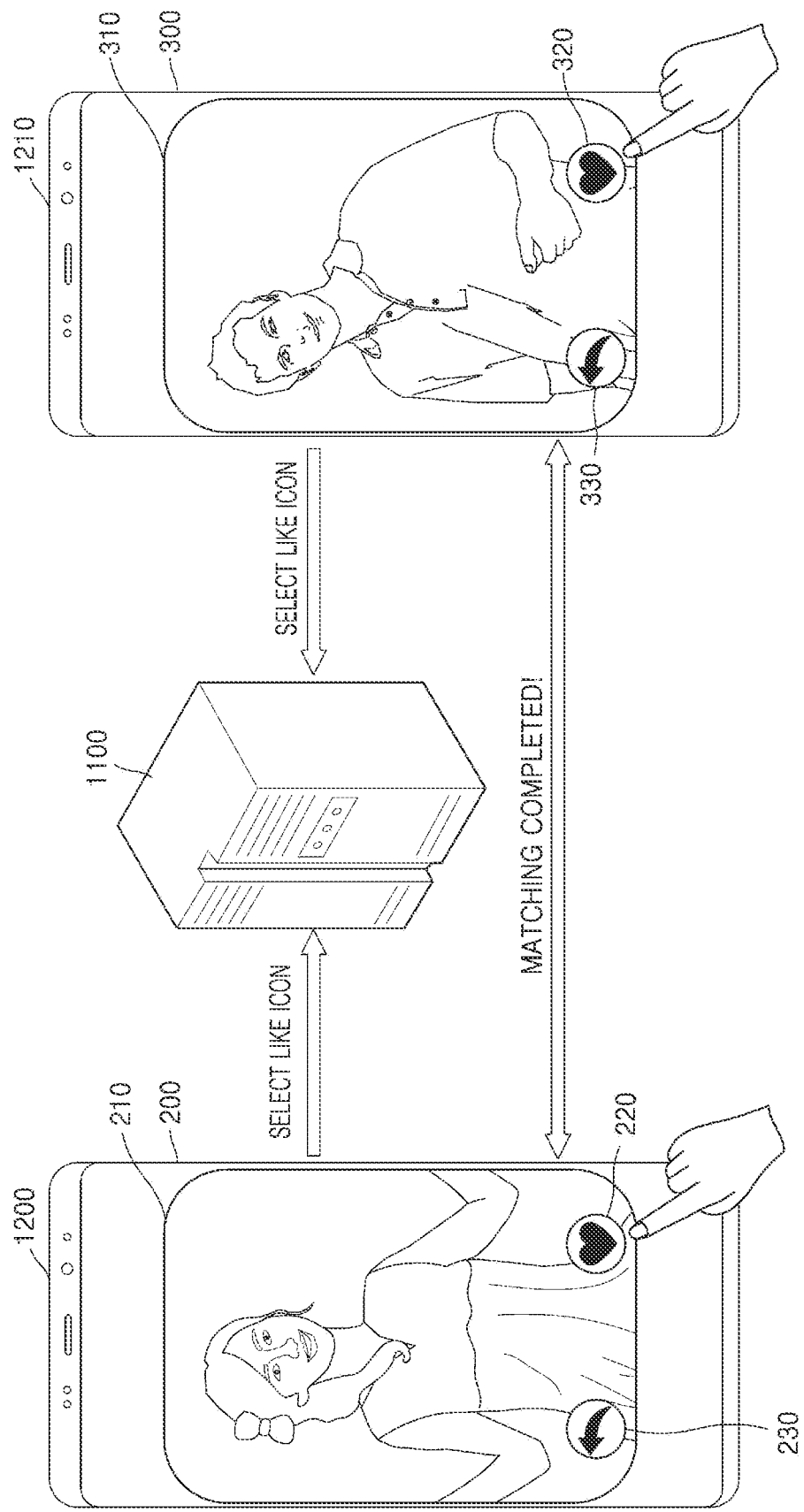
FIG. 3 is a diagram illustrating an example in which matching between terminals is completed.

FIG. 3 is a diagram illustrating an example in which matching between terminals is completed.

As described above with reference to FIG. 2, the server 1100 may receive the like signal transmitted from the first terminal 1200, based on the profile information about the second terminal 1210.

Similarly, profile information 310 of the first user of the first terminal 1200 may be displayed on a display 300 of the second terminal 1210. In addition, a like icon 320 and a dislike icon 330 may be displayed on the display 300 of the second terminal 1210. The second user of the second terminal 1210 may select the like icon 320 when they want to proceed with a video call with the first user, and select the dislike icon 330 when they do not want to proceed with the video call with the first user.

Also, the second terminal 1210 may transmit, to the server 1100, information indicating that the second user has inputted a like signal, based on the profile information 310 of the first user. As described above, the like signal may be transmitted to the server 1100 when the second user presses the like icon 320, but embodiments are not limited thereto. For example, the like signal may be transmitted to the server 1100 even when the second user swipes or drags the like icon 320.

Here, the server 1100 may determine that matching between the first user and the second user is completed, when the like signal transmitted by the first terminal 1200, based on the profile information 210 of the second user, and the like signal transmitted by the second terminal 1210, based on the profile information 310 of the first user, are both received. In other words, the server 1100 may determine that the matching between the first user and the second user is not completed, when information indicating that the first user has selected the dislike icon 230, based on the profile information 210 of the second user or information indicating that the second user has selected the dislike icon 330, based on the profile information 310 of the first user, is received.

Figure 4:
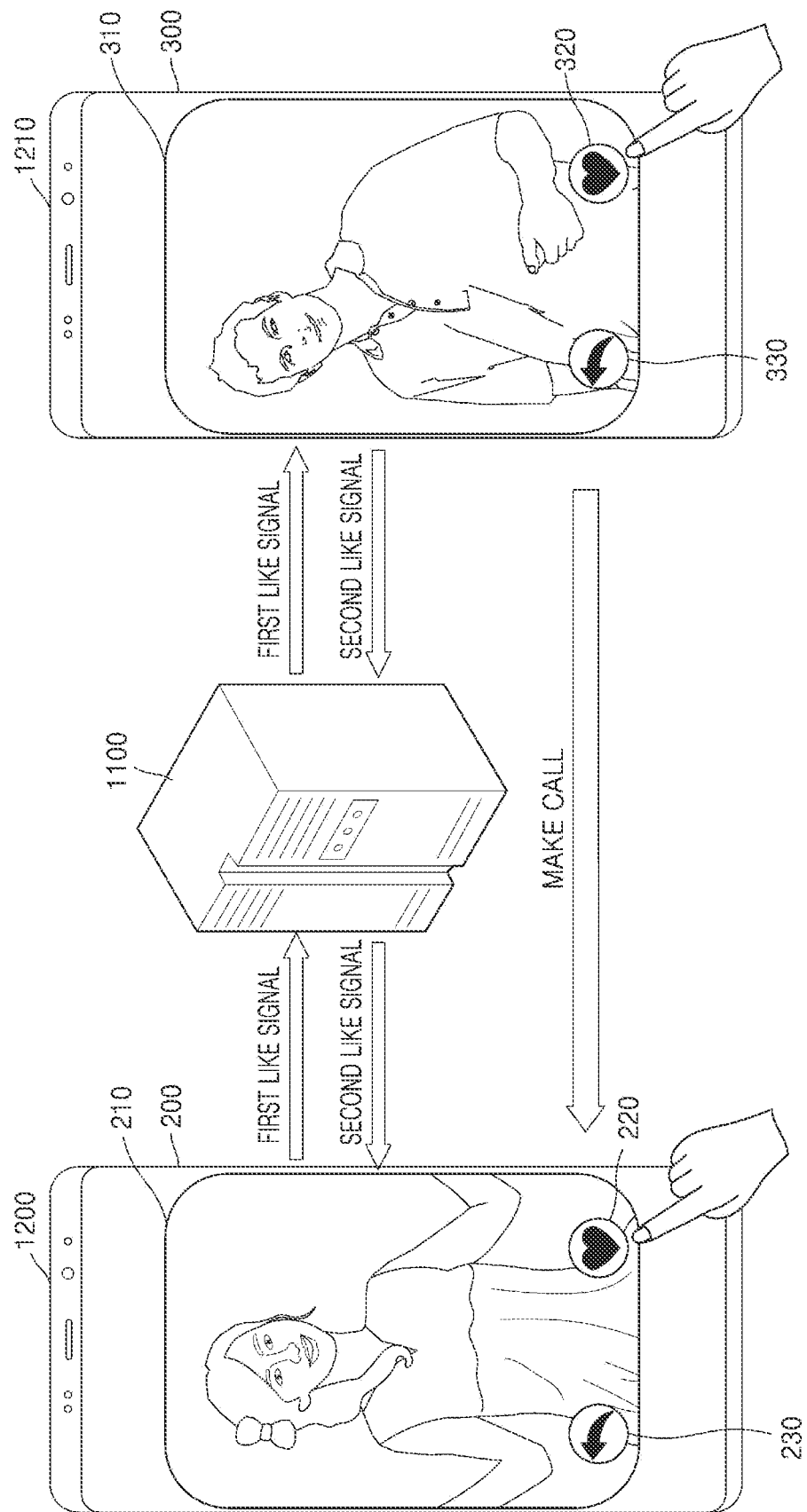
FIG. 4 is a diagram illustrating an example in which a call is made when matching between terminals is completed.

FIG. 4 is a diagram illustrating an example in which a call is made when matching between terminals is completed.

When the matching between the first user of the first terminal 1200 and the second user of the second terminal 1210 is completed, the server 1100 may provide a call service between the first terminal 1200 and the second terminal 1210.

For example, when the matching between the first user of the first terminal 1200 and the second user of the second terminal 1210 is completed, the first terminal 1200 or the second terminal 1210 may automatically make a call. In other words, the call may be automatically made even when the first user or the second user does not perform an input for making a call on the first terminal 1200 or the second terminal 1210.

The second terminal 1210 may receive a first like signal transmitted from the first terminal 1200 to the server 1100. Also, the second terminal 1210 may transmit, to the server 1100, a second like signal regarding the first user of the first terminal 1200. In this case, the server 1100 may determine that the matching between the first user of the first terminal 1200 and the second user of the second terminal 1210 is completed. Accordingly, the server 1100 may transmit a signal for establishing a call connection between the first terminal 1200 and the second terminal 1210, to the first terminal 1200 or the second terminal 1210.

Referring to FIG. 4, the second terminal 1210 may transmit a second like signal to the first terminal 1200 after receiving the first like signal. In other words, the server 1100 may receive the second like signal transmitted by the second terminal 1210 based on the profile information 310 of the first user, after receiving the first like signal transmitted by the first terminal 1200 based on the profile information 210 of the second user. In this case, the server 1100 may automatically make (or initiate) a call from the second terminal 1210 to the first terminal 1200. For example, a call may be made from the second terminal 1210 to the first terminal 1200 even when the second user of the second terminal 1210 does not perform a separate operation for making a call.

Meanwhile, the first terminal 1200 may determine whether to accept a call automatically made from the second terminal 1210. When the first terminal 1200 transmits, to the server 1100, a response accepting the call, the call between the first terminal 1200 and the second terminal 1210 may be performed. However, when the first terminal 1200 transmits, to the server 1100, a response rejecting the call or when the first terminal 1200 does not respond, the call between the first terminal 1200 and the second terminal 1210 may fail. However, since the first terminal 1200 may store a list including users regarding which the first terminal 1200 has transmitted like signals to the server 1100 and the second user of the second terminal 1210 may be included in the list, the first terminal 1200 may make a call to the second terminal 1210 at any time. Similarly, since the first user of the first terminal 1200 is included in a list stored in the second terminal 1210, the second terminal 1210 may make a call to the first terminal 1200 at any time.

Meanwhile, even when the first user of the first terminal 1200 is not connected to an application provided by the server 1100, the first terminal 1200 may receive a call made from the second terminal 1210.

As such, a call can be made automatically when matching between the first and second users is completed, and thus a burden of the first and second users having to directly call a counterpart may be eliminated.

When the server 1100 makes a call from the second terminal 1210 to the first terminal 1200, a preliminary call may be performed between the first user and the second user after a call waiting time has elapsed. In other words, during and/or after the call waiting time has elapsed, the first user of the first terminal 1200 may determine whether to accept an incoming call, and when the first user of the first terminal 1200 accepts the incoming call, the preliminary call may be connected between the first user of the first terminal 1200 and the second user of the second terminal 1210.

The preliminary call may be performed before proceeding to a main call between the first user of the first terminal 1200 and the second user of the second terminal 1210. In other words, the preliminary call may be performed before the first user and the second user determine whether to proceed with the main call. For example, the preliminary call may correspond to a video call or a voice call relayed for a preset time.

The first user of the first terminal 1200 and the second user of the second terminal 1210 may determine whether to proceed with the main call after the preliminary call is terminated.

For example, the preliminary call may correspond to a voice call and the main call may correspond to a video call. In other words, since it is possible to determine whether to perform a video call through a voice call before performing the video call, i.e., the main call, the first and second users may feel less burdened in performing the video call. In addition, a conversion rate to the main call, i.e., the video call, may be increased when the preliminary call is a voice call rather than a video call. The present disclosure is not limited thereto, and the preliminary call may correspond to a video call, and the main call may also correspond to a video call.

FIGS. 5A-5D illustrates examples of a graphical user interface displayed on a display of a terminal during a call waiting time.

As described above with reference to FIG. 4, the server 1100 may automatically make (or initiate) a call from the second terminal 1210 to the first terminal 1200, when the like signal transmitted by the second terminal 1210, based on the profile information 310 of the first user, is received after the like signal transmitted by the first terminal 1200, based on the profile information 210 of the second user, is received.

When a call is made from the second terminal 1210 to the first terminal 1200, the call between the second user of the second terminal 1210 and the first user of the first terminal 1200 may be connected during and/or after the call waiting time has elapsed.

For example, the first user of the first terminal 1200 may determine whether to accept an incoming call during and/or after the call waiting time has elapsed. When the first user of the first terminal 1200 accepts the incoming call, a preliminary call may be connected between the first user of the first terminal 1200 and the second user of the second terminal 1210, and when the first user of the first terminal 1200 rejects the incoming call, the preliminary call between the first user of the first terminal 1200 and the second user of the second terminal 1210 may not be connected.

During the call waiting time, a camera of each of the first terminal 1200 and the second terminal 1210 may be activated. FIGS. 5A-5D illustrates examples of a graphical user interface displayed on a display 500 of the second terminal 1210 during the call waiting time.

Referring to FIGS. 5A-5D, the camera of the second terminal 1210 may be activated during the call waiting time, and an image of the second user captured by the camera may be displayed on the display 500 of the second terminal 1210. Although not shown in FIGS. 5A-5D, an image of the first user captured by the camera of the first terminal 1200 may also be displayed on a display of the first terminal 1200. Accordingly, the first and second users may check their faces before a call is connected.

Also, the call waiting time may be sequentially counted down, and a graphical user interface in which the call waiting time is sequentially counted down may be displayed on the display 500 of the second terminal 1210. Meanwhile, in FIGS. 5A-5D, the call waiting time is set to 10 seconds, but embodiments are not limited thereto. When the call waiting time is 10 seconds, the graphical user interface in which the call waiting time is sequentially counted down from 10 to 1 may be displayed on the display 500 of the second terminal 1210. For example, the graphical user interface counting down from 10 to 1 may be displayed on the display 500 of the second terminal 1210 in units of 1 second, but in FIGS. 5A-5D, a time point at which a countdown of the call waiting time starts, a time point at which 7 seconds remain, a time point at which 3 seconds remain, and a time point at which the countdown ends are briefly illustrated.

Also, as the call waiting time is sequentially counted down, visibility of an image area 510 of the second user displayed on the display 500 of the second terminal 1210 may change. As the call waiting time is sequentially counted down, a width or opacity of an area 520 covering at least a part of the display 500 of the second terminal 1210 may change. In other words, as the area 520 covering at least a part of the display 500 of the second terminal 1210 changes, the visibility of the image area 510 of the second user displayed on the display 500 may change.

For example, when the countdown of the call waiting time starts, the area 520 covering at least a part of the display 500 of the second terminal 1210 may cover all of the image area 510 of the second user. As the call waiting time is sequentially counted down, the area 520 covering at least a part of the display 500 of the second terminal 1210 may also gradually change. Accordingly, when the countdown of the call waiting time ends, the area 520 covering at least a part of the display 500 of the second terminal 1210 disappears, and the image area 510 of the second user may be completely revealed. The revelation of the image area 510 of the second user may provide various benefits, such as (but not limited to) allowing for symmetry with the preliminary call, highlighting the countdown to help the user prepare, etc. In a number of embodiments, the image area 510 of the second terminal 1210 may not be covered during the call waiting time.

For example, as the call waiting time is sequentially counted down, the width of the area 520 covering at least a part of the display 500 of the second terminal 1210 may gradually decrease, and the opacity of the area 520 covering at least a part of the display 500 of the second terminal 1210 may gradually decrease.

Figure 5:
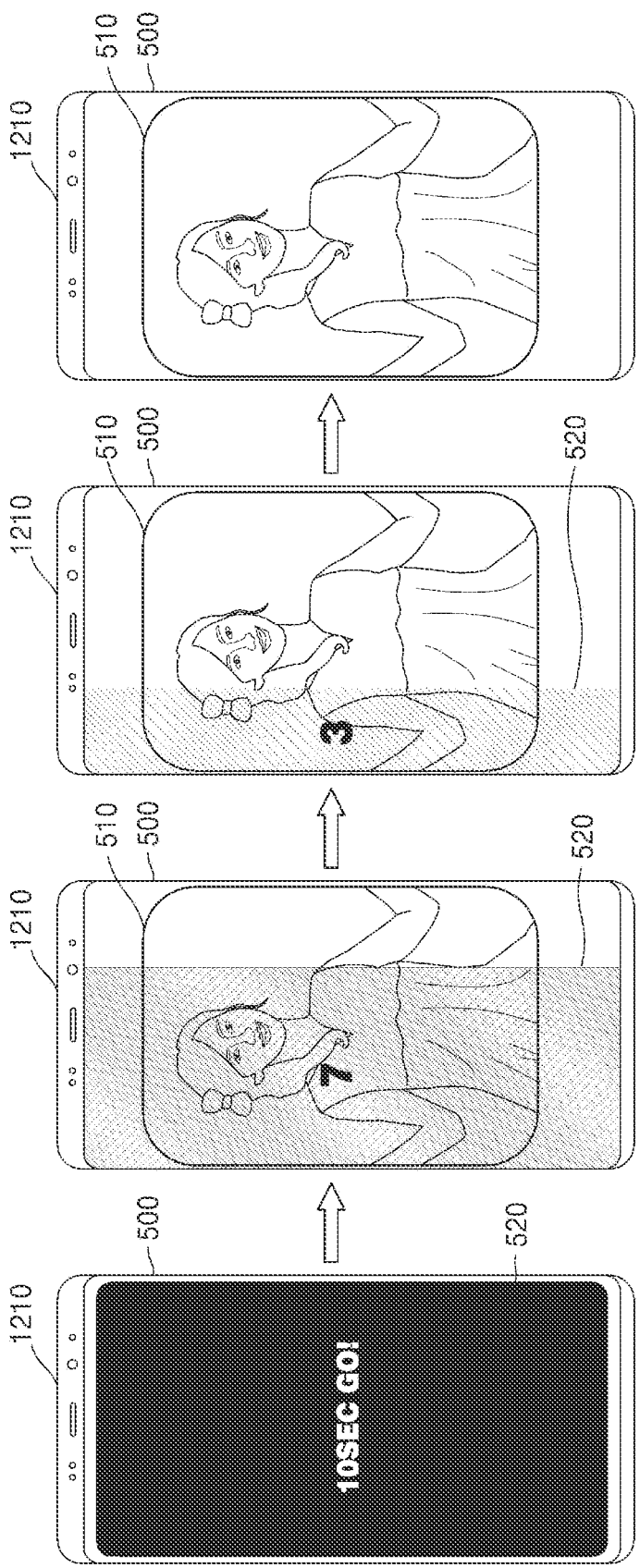
FIGS. 5A-5D illustrates examples of a graphical user interface displayed on a display of a terminal during a call waiting time.

Referring to FIG. 5A, the width of the area 520 covering at least a part of the display 500 of the second terminal 1210 when the countdown of the call waiting time starts may be the same as a width of the display 500 of the second terminal 1210, and the opacity of the area 520 covering at least a part of the display 500 of the second terminal 1210 may have a preset value enough to cover the image area 510 of the second user.

Referring to FIG. 5B, the width of the area 520 covering at least a part of the display 500 of the second terminal 1210 when 7 seconds remain for the call waiting time may be set to be a value obtained by multiplying 0.7 by the width of the display 500 of the second terminal 1210, and the opacity of the area 520 covering at least a part of the display 500 of the second terminal 1210 may be set to be a value obtained by multiplying 0.7 by the preset value enough to cover the image area 510 of the second user.

Also, referring FIG. 5C, the width of the area 520 covering at least a part of the display 500 of the second terminal 1210 when 3 seconds remain for the call waiting time may be set to be a value obtained by multiplying 0.3 by the width of the display 500 of the second terminal 1210, and the opacity of the area 520 covering at least a part of the display 500 of the second terminal 1210 may be set to be a value obtained by multiplying 0.3 by the preset value enough to cover the image area 510 of the second user.

Referring to FIG. 5D, when the call waiting time ends, the area 520 covering at least a part of the display 500 of the second terminal 1210 disappears, and the image area 510 of the second user may be completely revealed.

As described above, the width of the area 520 covering at least a part of the display 500 of the second terminal 1210 may be determined to be a value obtained by multiplying the width of the display 500 of the second terminal 1210 by a certain ratio. For example, the certain ratio may be set to be a value obtained by dividing a remaining call waiting time by the call waiting time as the countdown proceeds, but embodiments are not limited thereto. Similarly, the opacity of the area 520 covering at least a part of the display 500 of the second terminal 1210 may be determined to be a value obtained by multiplying preset opacity by a certain ratio. Here, the preset opacity may be set to be a value enough to completely cover the image area 510 of the second user, and the certain ratio may be set to be a value obtained by dividing the remaining call waiting time by the call waiting time as the countdown proceeds, but are not limited thereto.

Meanwhile, the image of the first user may also be displayed on the display of the first terminal 1200 during the call waiting time, and a change in an area covering at least a part of the graphical user interface of the first terminal 1200 as the call waiting time is sequentially counted may be the same as described above.

Figure 6:
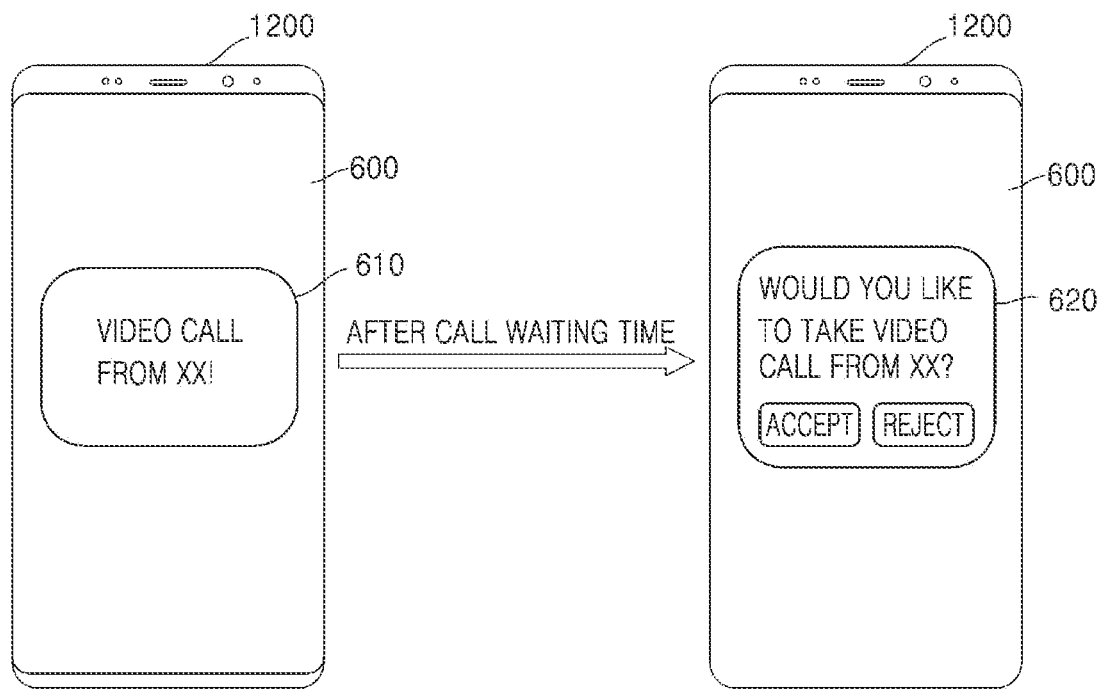
FIG. 6 illustrates another example of a graphical user interface displayed on a display of a terminal during a call waiting time.

FIG. 6 illustrates another example of a graphical user interface displayed on a display of a terminal during a call waiting time.

FIG. 6 illustrates an example of a graphical user interface displayed on a display 600 of the first terminal 1200 when a call is made from the second terminal 1210 to the first terminal 1200.

First, when the call is made from the second terminal 1210 to the first terminal 1200, the display 600 of the first terminal 1200 may display a message window 610 indicating that the call is made from the second user of the second terminal 1210.

After the message window 610 indicating that the call is made from the second user of the second terminal 1210 is displayed, the camera of the first terminal 1200 may be activated. The display 600 of the first terminal 1200 may display an image of the first user captured by the camera, and at the same time, a graphical user interface in which the call waiting time is sequentially counted down may be displayed. The graphical user interface in which the call waiting time is sequentially counted down may be the same as described above with reference to FIGS. 5A-5D.

A message window 620 inquiring whether to accept the call with the second user of the second terminal 1210 may be displayed on the display 600 of the first terminal 1200, during and/or after the call waiting time ends.

When the first user of the first terminal 1200 selects a button accepting an incoming call, a preliminary call between the first user of the first terminal 1200 and the second user of the second terminal 1210 may be connected. When the first user of the first terminal 1200 selects a button rejecting the incoming call, the preliminary call between the first user of the first terminal 1200 and the second user of the second terminal 1210 may not be connected.

For example, when the first user of the first terminal 1200 selects the button accepting the incoming call, the server 1100 may relay the preliminary call between the first terminal 1200 and the second terminal 1210 for a preset time.

After the preset time during which the preliminary call is relayed has elapsed, the server 1100 may receive a response as to whether to perform a main call from the first user of the first terminal 1200 and the second user of the second terminal 1210, to determine whether to proceed with the main call.

Meanwhile, a first graphical user interface displayed on a display of each of the first terminal 1200 and the second terminal 1210 while the preliminary call is in progress may be different from a second graphical user interface displayed on the display of each of the first terminal 1200 and the second terminal 1210 while the main call is in progress. The first graphical user interface displayed on the display of each of the first terminal 1200 and the second terminal 1210 while the preliminary call is in progress will be described with reference to FIGS. 7A-7D below.

FIGS. 7A-7D illustrates examples of a graphical user interface displayed on a display of a terminal while a preliminary call is in progress.

While the preliminary call is in progress, the display of each of the first terminal 1200 and the second terminal 1210 may display an image area of a user of a counterpart terminal performing the preliminary call and a blocking area covering at least a part of the image area. For example, the blocking area may change as a preset time during which the preliminary call is relayed elapses, and visibility of the image area of the user of the counterpart terminal may change based on the blocking area.

For example, the camera of each of the first terminal 1200 and the second terminal 1210 may be activated during the preset time during which the preliminary call is proceeded. An image of the second user captured by the camera of the second terminal 1210 may be displayed on the display of the first terminal 1200, and an image of the first user captured by the camera of the first terminal 1200 may be displayed on the display of the second terminal 1210. FIGS. 7A-7D illustrates examples of a graphical user interface displayed on a display 700 of the second terminal 1210 for a preset time.

Referring to FIGS. 7A-7D, the preset time may be sequentially counted down, and a graphical user interface in which the preset time is sequentially counted down may be displayed on the display 700 of the second terminal 1210. Meanwhile, in FIGS. 7A-7D, the preset time is set to be 30 seconds, but embodiments are not limited thereto. When the preset time is 30 seconds, the graphical user interface in which the preset time is sequentially counted down from 30 to 1 may be displayed on the display 700 of the second terminal 1210. For example, the graphical user interface counting down from 30 to 1 may be displayed on the display 700 of the second terminal 1210 in units of 1 second, but in FIGS. 7A-7D, a time point at which a countdown of the preset time starts, a time point at which 15 seconds remain, a time point at which 3 seconds remain, and a time point at which the countdown ends are briefly illustrated.

Also, as the preset time is sequentially counted down, visibility of an image area 710 of the first user displayed on the display 700 of the second terminal 1210 may change. As the preset time is sequentially counted down, a width or opacity of a blocking area 720 covering at least a part of the display 700 of the second terminal 1210 may change. In other words, as the blocking area 720 covering at least a part of the display 700 of the second terminal 1210 changes, the visibility of the image area 710 of the first user displayed on the display 700 may change.

For example, the image area 710 of the first user may be completely revealed when the countdown of the preset time starts. As the preset time is sequentially counted down, the blocking area 720 covering at least a part of the display 700 of the second terminal 1210 may also gradually change. Accordingly, when the countdown of the preset time ends, the blocking area 720 covering at least a part of the display 700 of the second terminal 1210 may completely cover the image area 710 of the first user.

For example, as the preset time is sequentially counted down, the width of the blocking area 720 covering at least a part of the display 700 of the second terminal 1210 may gradually increase. Alternatively or conjunctively, the opacity of the blocking area 720 covering at least a part of the display 700 of the second terminal 1210 may gradually increase.

Referring to FIG. 7A, the image area 710 of the first user may be completely revealed when the countdown of the preset time starts.

Referring to FIG. 7B, the width of the blocking area 720 covering at least a part of the display 700 of the second terminal 1210 when 15 seconds remain for the preset time may be set to be a value obtained by multiplying 0.5 by the width of the display 700 of the second terminal 1210, and the opacity of the blocking area 720 covering at least a part of the display 700 of the second terminal 1210 may be set to be a value obtained by multiplying 0.5 by a preset value enough to cover the image area 710 of the first user.

Also, referring FIG. 7C, the width of the blocking area 720 covering at least a part of the display 700 of the second terminal 1210 when 3 seconds remain for the preset time may be set to be a value obtained by multiplying 0.9 by the width of the display 700 of the second terminal 1210, and the opacity of the blocking area 720 covering at least a part of the display 700 of the second terminal 1210 may be set to be a value obtained by multiplying 0.9 by the preset value enough to cover the image area 710 of the first user.

Also, referring FIG. 7D, the width of the blocking area 720 covering at least a part of the display 700 of the second terminal 1210 when the preset time ends may be set to be the same as the width of the display 700 of the second terminal 1210, and the opacity of the blocking area 720 covering at least a part of the display 700 of the second terminal 1210 may be set to be the same as the preset value enough to cover the image area 710 of the first user.

As described above, the width of the blocking area 720 covering at least a part of the display 700 of the second terminal 1210 may be determined to be a value obtained by multiplying the width of the display 700 of the second terminal 1210 by a certain ratio. For example, the certain ratio may be set to be a value obtained by dividing a time elapsed as the countdown starts by the preset time, but embodiments are not limited thereto. Similarly, the opacity of the blocking area 720 covering at least a part of the display 700 of the second terminal 1210 may be determined to be a value obtained by multiplying preset opacity by a certain ratio. Here, the preset opacity may be set to be a value enough to completely cover the image area 710 of the first user, and the certain ratio may be set to be a value obtained by dividing the time elapsed as the countdown starts by the preset time, but are not limited thereto.

An image of the second user of the second terminal 1210 may also be displayed on a display of the first terminal 1200 for the preset time, and a change in an area covering at least a part of the display of the first terminal 1200 as the preset time is sequentially counted may be the same as described above.

As described above, because a face of a counterpart is gradually hidden on a graphical user interface of a terminal as a preset time is sequentially counted down, a burden of a user when determining whether to proceed with a main call after a preliminary call ends may be relieved.

Meanwhile, referring FIG. 7D, after the preset time has elapsed, the display 700 of the second terminal 1210 may display a message window 730 requesting a response as to whether to proceed with the main call with the first user. Also, after the preset time has elapsed, a message window requesting a response as to whether to proceed with the main call with the second user may also be displayed on a display of the first terminal 1200. The responses of the first user and the second user may be transmitted to the server 1100, and the server 1100 may or may not proceed with the main call, based on the responses.

For example, the server 1100 may proceed with the main call when a response accepting to proceed with the main call is received from each of the first terminal 1200 and the second terminal 1210. Also, the server 1100 may not proceed with the main call when a response rejecting to proceed with the main call is received from the first terminal 1200 or the second terminal 1210.

Figure 8:
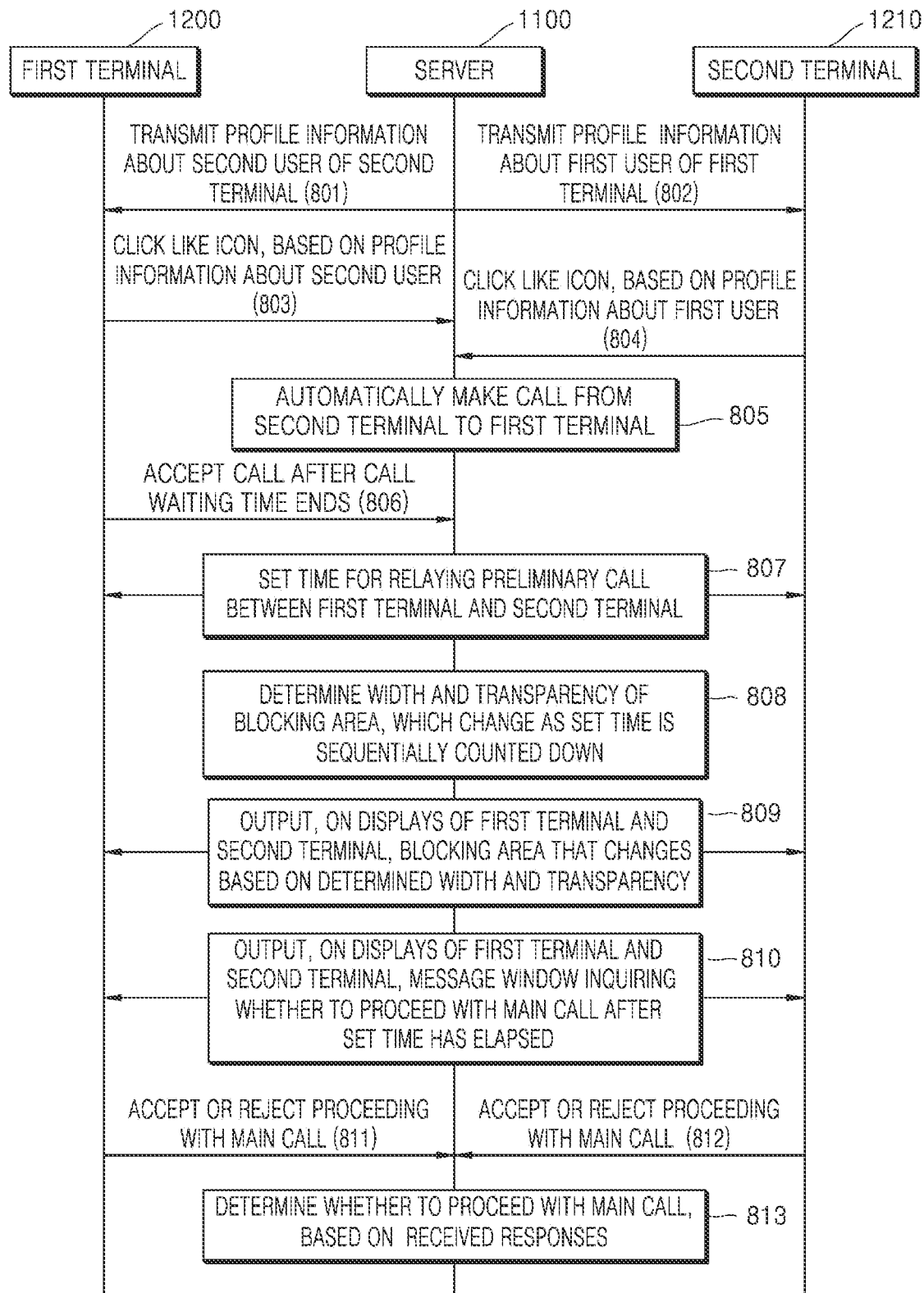
FIG. 8 is a diagram illustrating processes in which a video call is made in a system including a first terminal, a server, and a second terminal, according to an embodiment.

FIG. 8 is a diagram illustrating processes in which a video call is made in a system including the first terminal 1200, the server 1100, and the second terminal 1210, according to an embodiment.

Referring to FIG. 8, in operation 801, the server 1100 may transmit profile information about the second user of the second terminal 1210 to the first terminal 1200. Also, in operation 802, the server 1100 may transmit profile information about the first user of the first terminal 1200 to the second terminal 1210.

In operation 803, the first user of the first terminal 1200 may click on a like icon, based on the profile information about the second user. When the first user of the first terminal 1200 clicks the like icon, the server 1100 may receive information, from the first terminal 1200, indicating that the first user has selected the like icon based on the profile information about the second user.

Also, in operation 804, the second user of the second terminal 1210 may click on a like icon, based on the profile information about the first user. When the second user of the second terminal 1210 clicks the like icon, the server 1100 may receive information, from the second terminal 1210, indicating that the second user has selected the like icon based on the profile information about the first user. The server 1100 may determine that matching between the first user and the second user is completed, when both the information indicating that the first user has selected the like icon based on the profile information about the second user and the information indicating that the second user has selected the like icon based on the profile information about the first user are received.

In operation 805, the server 1100 may automatically make a call from the second terminal 1210 to the first terminal 1200. In other words, the server 1100 may automatically make (or initiate) a call to the first terminal 1200 even when the second user does not perform an input for performing a call.

When the call is automatically made from the second terminal 1210 to the first terminal 1200, a message window informing the first user that the call is made from the second user of the second terminal 1210 may be displayed on a display of the first terminal 1200. When the call is automatically made from the second terminal 1210 to the first terminal 1200, a preliminary call may be connected between the second user and the first user after a call waiting time has elapsed. The call waiting time may be sequentially counted down, and a graphical user interface in which the call waiting time is sequentially counted down may be displayed on displays of the first terminal 1200 and second terminal 1210.

In operation 806, the first terminal 1200 may accept the call during and/or after the call waiting time ends. For example, a message window inquiring whether to accept the call with the second user of the second terminal 1210 may be displayed on the display of the first terminal 1200, during and/or after the call waiting time ends.

In operation 807, the server 1100 may set a time for relaying the preliminary call between the first terminal 1200 and the second terminal 1210. For example, the server 1100 may relay the preliminary call only for the set time, and determine whether to proceed with a main call after the set time has elapsed.

In operation 808, the server 1100 may set a blocking area that changes as the set time is sequentially counted down. For example, the server 1100 may set a width and opacity of the blocking area, which change as the set time is sequentially counted down. The blocking area may correspond to an area covering at least a part of the display of each of the first terminal 1200 and the second terminal 1210. The width of the blocking area may increase as the set time is sequentially counted down, and the opacity of the blocking area may increase as the set time is sequentially counted down. For example, the width of the blocking area may be determined to be a value obtained by multiplying a width of the display by a certain ratio. The certain ratio may be determined to be a value obtained by dividing a time for which a countdown has been pre-performed by a time for which a countdown is to be performed, but embodiments are not limited thereto. Similarly, the opacity of the blocking area may be determined to be a value obtained by multiplying preset opacity by a certain ratio. The certain ratio may be determined to be a value obtained by dividing a time for which a countdown has been pre-performed by a time for which a countdown is to be performed, but embodiments are not limited thereto.

In operation 809, the server 1100 may output the blocking area to the displays of the first terminal 1200 and the second terminal 1210. For example, the server 1100 may output the blocking area that changes based on the set width and opacity, on the displays of the first terminal 1200 and the second terminal 1210. As the blocking area that changes based on the determined width and opacity is output to the displays of the first terminal 1200 and the second terminal 1210, visibility of an image area of the second user displayed on the display of the first terminal 1200 may change, and visibility of an image area of the first user displayed on the display of the second terminal 1210 may change.

In operation 810, the server 1100 may output a message window inquiring whether to proceed with a main call on the displays of the first terminal 1200 and the second terminal 1210 after the set time has elapsed.

In operation 811, the first terminal 1200 may transmit, to the server 1100, a response accepting or rejecting to proceed with the main call. Also, in operation 812, the second terminal 1210 may transmit, to the server 1100, a response accepting or rejecting to proceed with the main call.

In operation 813, the server 1100 may determine whether to proceed with the main call, based on the received responses. For example, the server 1100 may extend the main call when the response accepting to proceed with the main call is received from each of the first terminal 1200 and the second terminal 1210. Also, the server 1100 may not proceed with the main call when the response rejecting to proceed with the main call is received from the first terminal 1200 or the second terminal 1210.

Figure 9:
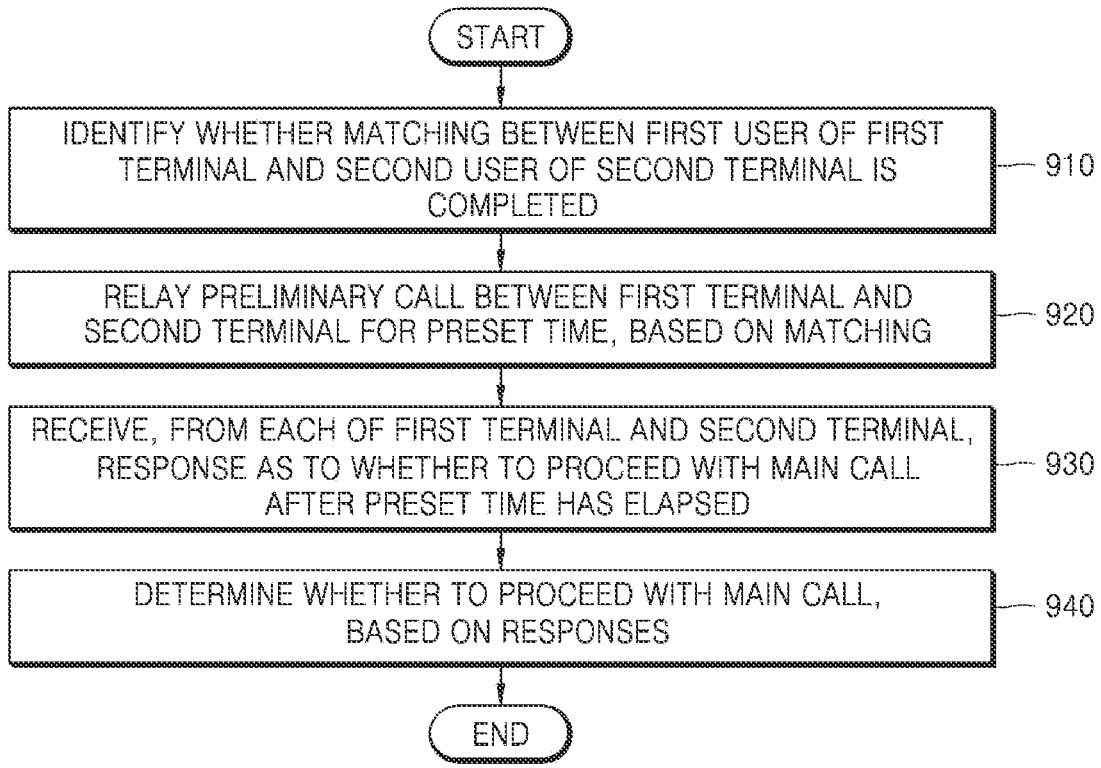
FIG. 9 is a flowchart of a method of relaying a video call, according to an embodiment.

FIG. 9 is a flowchart of a method of relaying a call, according to an embodiment.

Referring to FIG. 9, in operation 910, the server 1100 may identify whether matching between a first user of a first terminal and a second user of a second terminal is completed.

For example, the server 1100 may determine that matching between the first user and the second user is completed, when a like signal transmitted by the first terminal, based on profile information about the second user of the second terminal, and a like signal transmitted by the second terminal, based on profile information 310 of the first user of the first terminal, are both received. In other words, the server 1100 may determine that matching between the first user and the second user is not completed when a dislike signal transmitted by the first terminal based on the profile information about the second user of the second terminal, or a dislike signal transmitted by the second terminal based on the profile information about the first user of the first terminal, is received.

In operation 920, the server 1100 may relay a preliminary call between the first terminal and the second terminal for a preset time, based on the matching.

When the matching between the first user of the first terminal and the second user of the second terminal is completed, the server 1100 may provide a call service between the first terminal and the second terminal. The server 1100 may transmit, to the first terminal or the second terminal, a request for establishing a communication connection between the first terminal and the second terminal.

In other words, when the matching between the first user of the first terminal and the second user of the second terminal is completed, a call may be automatically made from the first terminal or the second terminal. The call may be automatically made even when the first user or the second user does not perform an input for making a call on the first terminal or the second terminal. Also, when the call is automatically made from the second terminal to the first terminal, a message window informing the first user that the call is made from the second user of the second terminal may be displayed on a display of the first terminal.

When the call is automatically made from the second terminal to the first terminal, the preliminary call may be connected between the second user of the second terminal and the first user of the first terminal after a call waiting time has elapsed. For example, the preliminary call may correspond to a video call or a voice call relayed for a preset time. During the call waiting time, a camera of each of the first terminal and the second terminal may be activated. The call waiting time may be sequentially counted down, and a graphical user interface in which the call waiting time is sequentially counted down may be displayed on displays of the first terminal and second terminal. A message window inquiring whether to accept the call with the second user of the second terminal may be displayed on the display of the first terminal, during and/or after the call waiting time ends. When the first user of the first terminal selects a button accepting an incoming call, the preliminary call between the first user of the first terminal and the second user of the second terminal may be connected.

In this case, the server 1100 may relay the preliminary call between the first terminal and the second terminal only for a preset time. During the preset time, the camera of each of the first terminal and the second terminal may be activated. An image of the second user captured by the camera of the second terminal may be displayed on the display of the first terminal, and an image of the first user captured by the camera of the first terminal may be displayed on the display of the second terminal.

During the preset time, a graphical user interface in which the preset time is sequentially counted down may be displayed on each of the first terminal and the second terminal. As the preset time is sequentially counted down, visibility of an image area of the second user displayed on the display of the first terminal may change, and visibility of an image area of the first user displayed on the display of the second terminal may change.

For example, as the preset time is sequentially counted down, a width of a first area covering at least a part of the display of the first terminal may increase while opacity of the first area increases, and a width of a second area covering at least a part of the display of the second terminal may increase while opacity of the second area increases.

In operation 930, the server 1100 may receive, from each of the first terminal and the second terminal, a response as to whether to proceed with a main call after the preset time has elapsed.

After the preset time has elapsed, a message window requesting a response as to whether to proceed with the main call with the first user may also be displayed on the display of the second terminal. Also, after the preset time has elapsed, a message window requesting a response as to whether to proceed with the main call with the second user may also be displayed on the display of the first terminal. The responses of the first user and the second user may be transmitted to the server 1100. For example, the main call may correspond to a video call or a voice call.

In operation 940, the server 1100 may determine whether to proceed with the main call, based on the responses.

For example, the server 1100 may proceed with the main call when a response accepting to proceed with the main call is received from each of the first user of the first terminal and the second user of the second terminal. Also, the server 1100 may not proceed with the main call when a response rejecting to proceed with the main call is received from the first user or the second user.

Figure 10:
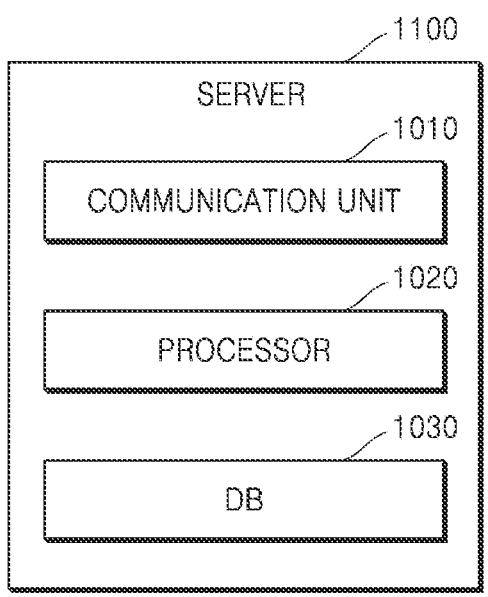
FIG. 10 illustrates an example of a block diagram of a server.

FIG. 10 illustrates an example of a block diagram of the server.

Referring to FIG. 10, the server 1100 may include a communication unit 1010, a processor 1020, and a database (DB) 1030. The server 1100 of FIG. 10 may be the same as the server 1100 of FIG. 1. Only components related to an embodiment are shown for the server 1100 of FIG. 10. Accordingly, it would be understood by one of ordinary skill in the art that general-purpose components other than those shown in FIG. 10 may be further included.

The communication unit 1010 may include one or more components enabling wired/wireless communication with a terminal. For example, the communication unit 1010 may include a short-range wireless communication unit (not shown), a mobile communication unit (not shown), and a broadcast receiver (not shown).

The DB 1030 is hardware storing various types of data processed in the server 1100, and may store a program for processes and controls by the processor 1020.

The DB 1030 may include random access memory (RAM) such as dynamic random access memory (DRAM) or static random access memory (SRAM), read-only memory (ROM), electrically erasable programmable read-only memory (EEPROM), CD-ROM, Blu-ray or another optical disk storage, a hard disk drive (HDD), a solid state drive (SSD), or a flash memory.

The processor 1020 controls overall operations of the server 1100. For example, the processor 1020 may generally control an input unit (not shown), a display (not shown), the communication unit 1010, and the DB 1030, by executing programs stored in the DB 1030. The processor 1020 may control operation of the server 1100 by executing programs stored in the DB 1030.

The processor 1020 may be implemented by using at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, or another electrical unit for performing functions.

The server 1100 may communicate with at least one user terminal through the communication unit 1010.

The communication unit 1010 may receive, from at least one terminal, information indicating that a like icon or a dislike icon is selected based on profile information about a user of another terminal. The processor 1020 may determine that matching between a first user and a second user is completed, when the communication unit 1010 receives both information indicating that the first user has selected a like icon based on profile information about the second user and information indicating that the second user has selected a like icon based on profile information about the first user.

The processor 1020 may relay a preliminary call between a first terminal and a second terminal for a certain period of time, based on the matching. The processor 1020 may set a time for relaying the preliminary call, and may perform a countdown for the set time. The processor 1020 may determine a width of a blocking area, which changes as a preset time is sequentially counted down, and may determine opacity of the blocking area, which changes as the preset time is sequentially counted down. The processor 1020 may output the blocking area on a graphical user interface of each of the first terminal and the second terminal, based on the determined width and opacity.

The communication unit 1010 may receive, from each of the first terminal and the second terminal, a response as to whether to proceed with a main call after the preset time has elapsed.

The processor 1020 may determine whether to proceed with the main call even after the preset time has elapsed, based on the received responses. The processor 1020 may proceed with the main call when a response accepting to proceed with the main call is received from each of the first terminal and the second terminal. Also, the processor 1020 may not proceed with the main call when a response rejecting to proceed with the main call is received from the first terminal or the second terminal.

According to an embodiment of the present disclosure described above, by relaying a video call between users only for a preset time and determining whether to continue the video call after the preset time, burdens of the users regarding the video call may be relieved.

Also, according to an embodiment of the present disclosure, because a face of a counterpart is gradually hidden on a graphical user interface of a terminal as a preset time is sequentially counted down, a burden of a user when determining whether to continue a video call may be relieved.

Various embodiments of the present disclosure may be implemented as software (for example, a program) including one or more instructions stored in a machine-readable storage medium. For example, a processor of the machine may invoke and execute at least one of the one or more instructions stored from the storage medium. Accordingly, the machine is enabled to operate to perform at least one function according to the at least one invoked instruction. The one or more instructions may include code generated by a compiler or code executable by an interpreter. The machine-readable storage medium may be provided in the form of a non-transitory storage medium. Here, 'non-transitory' only means that the storage medium is a tangible device and does not contain a signal (for example, electromagnetic waves). This term does not distinguish a case where data is stored in the storage medium semi-permanently and a case where the data is stored in the storage medium temporarily.

According to an embodiment, a method according to various embodiments of the present disclosure may be provided by being included in a computer program product. The computer program product is a product that can be traded between sellers and buyers. The computer program product may be distributed in a form of machine-readable storage medium (for example, a compact disc read-only memory (CD-ROM)), or distributed through an application store (for example, Play Store™) or directly or online between two user devices (for example, download or upload). In the case of online distribution, at least a part of the computer program product may be temporarily stored or temporarily generated in the machine-readable storage medium such as a server of a manufacturer, a server of an application store, or a memory of a relay server.

Furthermore, in the specification, the term "unit" may be a hardware component such as a processor or circuit and/or a software component that is executed by a hardware component such as a processor.

The scope of the present disclosure is defined by the appended claims rather than the detailed description, and all changes or modifications within the scope of the appended claims and their equivalents will be construed as being included in the scope of the present disclosure.

What is claimed is:

1. An operation method of a server, the operation method comprising:
   identifying whether matching between a first user of a first terminal and a second user of a second terminal is completed;
   relaying a preliminary call between the first terminal and the second terminal based on the matching, wherein the duration of the preliminary call is pre-determined to be a preset time;
   allowing conversation between the first user and the second user during the preliminary call;
   terminating the conversation of the preliminary call after the preset time elapses;
   asking each of the first terminal and the second terminal whether to proceed with a main call after the preset time has elapsed during the preliminary call;
   receiving, from each of the first terminal and the second terminal, a response as to whether to proceed with the main call after the preset time has elapsed during the preliminary call;
   determining whether to proceed with the main call, based on the response,
   wherein a first graphical user interface is displayed on a display of each of the first terminal and the second terminal during the preset time and a second graphical user interface is displayed on the display of each of the first terminal and the second terminal while the main call is in progress, and
   wherein the first graphical user interface and the second graphical user interface are different from each other; and
   resuming the conversation between the first user and the second user if proceeding to the main call.

2. The operation method of claim 1, wherein
   the determining of whether to proceed with the main call comprises:
   when a response accepting proceeding with the main call is received from each of the first terminal and the second terminal, proceeding with the main call; and
   when a response rejecting proceeding with the main call is received from at least one of the first terminal and the second terminal, not proceeding with the main call.

3. The operation method of claim 1, wherein
   the first graphical user interface comprises an image area of a counterpart terminal performing the preliminary call and a blocking area covering at least a part of the image area, wherein visibility of the image area changes over time.

4. The operation method of claim 3, wherein
   the second graphical user interface does not include the blocking area when the main call is proceeded.

5. The operation method of claim 3, wherein
   as the preset time is sequentially counted down, width of the blocking area gradually increases or opacity of the blocking area gradually increases.

6. The operation method of claim 3, wherein
   when a countdown of the preset time ends, the blocking area completely covers the image area of the counterpart terminal.

7. The operation method of claim 1, wherein
   the first graphical user interface comprises a graphical user interface for sequentially counting down the preset time.

8. The operation method of claim 1, wherein
   the identifying of whether the matching is completed comprises:

receiving a first like signal transmitted by the first terminal, based on profile information about the second user; and receiving a second like signal transmitted by the second terminal, based on profile information about the first user.

9. The operation method of claim 1, wherein
the preliminary call corresponds to a voice call and the main call corresponds to a video call.

10. A computer-readable recording medium having recorded thereon a program for executing, on a computer, the operation method of claim 1.

11. The operation method of claim 1, wherein
after the preset time elapsed, a message window requesting the response as to whether to proceed with the main call is displayed on the display of the first terminal and the second terminal.

12. A device for relaying a call, the device comprising:
a processor; and
a memory storing at least one program containing instructions that when read by the processor direct the processor to perform operations including:
identifying whether matching between a first user of a first terminal and a second user of a second terminal is completed;
relaying a preliminary call between the first terminal and the second terminal based on the matching, wherein the duration of the preliminary call is pre-determined to be a preset time;
allowing conversation between the first user and the second user during the preliminary call;
terminating the conversation of the preliminary call after the preset time elapses;
asking each of the first terminal and the second terminal whether to proceed with a main call after the preset time has elapsed during the preliminary call;
receiving, from each of the first terminal and the second terminal, a response as to whether to continue the main call after the preset time has elapsed during the preliminary call;
determining whether to proceed with the main call based on the response,
wherein a first graphical user interface is displayed on a display of each of the first terminal and the second terminal during the preset time and a second graphical user interface is displayed on the display of each of the first terminal and the second terminal while the main call is in progress, and
wherein the first graphical user interface and the second graphical user interface are different from each other; and
resuming the conversation between the first user and the second user if proceeding to the main call.

13. The device of claim 12, wherein
the at least one processor
proceeds with the main call when a response accepting proceeding with the main call is received from each of the first terminal and the second terminal, and
does not proceed with the main call when a response rejecting the proceeding with the main call is received from at least one of the first terminal and the second terminal.

14. The device of claim 12, wherein
after the preset time elapsed, a message window requesting the response as to whether to proceed with the main call is displayed on the display of the first terminal and the second terminal.

15. The device of claim 12, wherein
the first graphical user interface comprises an image area of a counterpart terminal performing the preliminary call and a blocking area covering at least a part of the image area, wherein visibility of the image area changes over time.

16. The device of claim 15, wherein
as the preset time is sequentially counted down, width of the blocking area gradually increases or opacity of the blocking area gradually increases, and
when a countdown of the preset time ends, the blocking area completely covers the image area of the counterpart terminal.

17. A first terminal comprising:
a communication unit configured to
receive a like signal transmitted from a second user of a second terminal to a server,
transmit a like signal regarding the second user of the second terminal to the server, and
receive a request for establishing a communication connection between the first terminal and the second terminal; and
a control unit configured to perform a preliminary call with the second terminal, according to the request, wherein the duration of the preliminary call is pre-determined to be a preset time and the preliminary call is terminated after the preset time elapses,
wherein the communication unit receives, from the server, a request for input as to whether to proceed with a main call with the second terminal after the preset time has elapsed,
wherein the communication unit transmits, to the server, a response as to whether to proceed with the main call with the second terminal after the preset time has elapsed during the preliminary call,
wherein a first graphical user interface displayed on a display during the preset time and a second graphical user interface displayed on the display while the main call is in progress, and
wherein the first graphical user interface and the second graphical user interface are different from each other.

18. The terminal of claim 17, wherein
the first graphical user interface comprises an image area of a counterpart terminal performing the preliminary call and a blocking area covering at least a part of the image area, wherein visibility of the image area changes over time, and
the second graphical user interface displays only the image area when the main call is proceeded.

19. The terminal of claim 18, wherein
as the preset time is sequentially counted down, width of the blocking area gradually increases or opacity of the blocking area gradually increases, and
when a countdown of the preset time ends, the blocking area completely covers the image area of the counterpart terminal.

20. The terminal of claim 17, wherein
after the preset time elapsed, a message window requesting the response as to whether to proceed with the main call is displayed on the display.

* * * * *